March 17, 1970  E. J. FALK  3,501,203
CONTROL VALVE
Filed May 17, 1968  2 Sheets-Sheet 1
FIG. 1
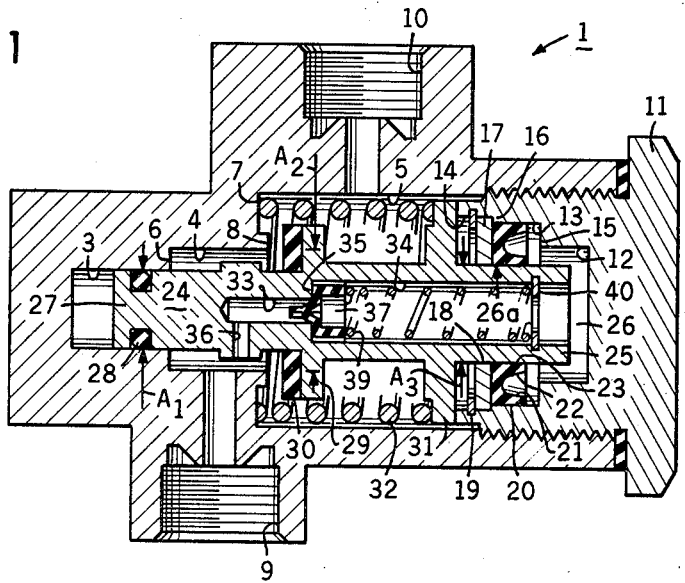
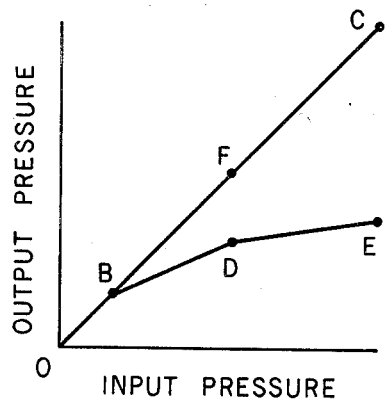
FIG. 4
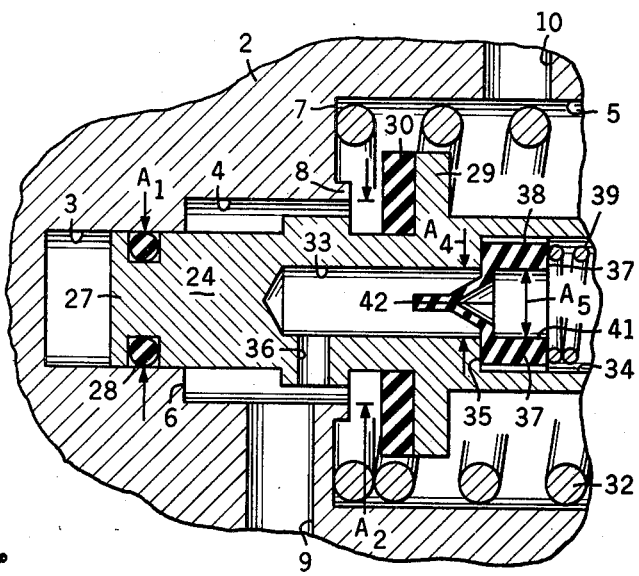
FIG. 2
FIG. 3
INVENTOR
EDWARD J. FALK
BY
Joseph E. Papin.

March 17, 1970     E. J. FALK     3,501,203

CONTROL VALVE

Filed May 17, 1968     2 Sheets-Sheet 2

INVENTOR
EDWARD J. FALK
BY
Joseph E. Papin

United States Patent Office 3,501,203
Patented Mar. 17, 1970

3,501,203
CONTROL VALVE
Edward J. Falk, St. Louis, Mo., assignor to Wagner Electric Corporation, Newark, N.J., a corporation of Delaware
Filed May 17, 1968, Ser. No. 730,101
Int. Cl. B60t 13/18
U.S. Cl. 303—6         18 Claims

ABSTRACT OF THE DISCLOSURE

A proportioning valve for controlling the application of fluid pressure supplied thereto from a master cylinder to a vehicle brake motor. The proportioning valve initially effects a first predetermined ratio between the supplied and applied fluid pressures up to a first predetermined value of the supplied fluid pressure and then effects a second predetermined ratio different than the first predetermined ratio in response to the supplied fluid pressure between the first predetermined value and another predetermined value in excess of the first predetermined value, said proportioning valve also being responsive to supplied fluid pressure in excess of the other predetermined value to effect a third predetermined ratio different than said first and second predetermined ratios.

---

This invention relates to control valves for fluid pressure braking systems and in particular to those for proportioning the fluid pressure applied therefrom with respect to the fluid pressure supplied thereto.

As is well known in the art, the ideal or theoretical proportion or ratio between the fluid pressure supplied the proportioning valve and the front vehicle brake motors and the fluid pressure applied from the proportioning valve to the rear vehicle brake motors is represented by a curve line substantially defining a parabolic function wherein the applied fluid pressure increases with respect to corresponding values of the input fluid pressure and becomes asymptotic with a predetermined output or applied fluid pressure limit, and one of the disadvantageous or undesirable features of the past proportioning valves was that they could not effect an applied fluid pressure in ratio with the fluid pressure supplied thereto which could closely approximate the ideal or theoretical ratio.

The principal object of the present invention is to provide a control valve which overcomes the aforementioned disadvantageous or undesirable feature and this, as well as other objects and advantageous features of the present invention, will become apparent in the following specification.

Briefly, the present invention embodies a control valve having resiliently urged means for normally effecting an applied fluid pressure in a first predetermined ratio with fluid pressure supplied thereto up to a first predetermined value and then effecting a second predetermined ratio different than said first predetermined ratio in response to supplied fluid pressures between said first predetermined value and another predetermined value in excess of said first predetermined value, and other means responsive to supplied fluid pressure in excess of said other predetermined value for establishing another fluid pressure opposing movement of said resiliently urged means in response to the supplied fluid pressure in excess of the other predetermined value to effect a third predetermined ratio different than said second predetermined ratio.

In the drawings which form a part of the specification and wherein like numerals refer to like parts wherever they occur:

FIG. 1 is a sectional view illustrating a control valve embodying the present invention in cross-section;

FIG. 2 is an enlarged fragmentary view taken from FIG. 1 showing a portion of the control valve thereof in cross-section;

FIG. 3 is a graphical representation illustrating the output fluid pressure effected by a control valve embodying the present invention in response to the input fluid pressure;

FIG. 4 is a fragmentary view taken from FIG. 1 showing an alternative construction also embodying the present invention in cross-section;

FIG. 6 is a sectional view illustrating another control valve embodying the present invention in cross-section; and FIG. 7 is an enlarged fragmentary view taken from FIG. 6 showing a portion of the control valve thereof in cross-section.

Figure 5:
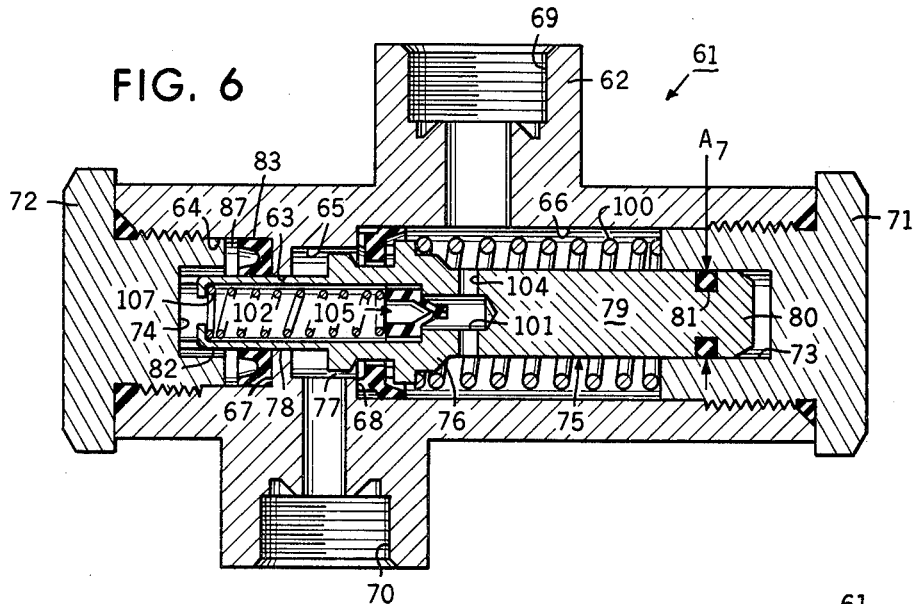
FIG. 5 is a graphical representation illustrating the output fluid pressure effected by the alternative construction of the control valve of FIG. 4 with the input fluid pressure and as altered by control fluid pressure.
Figure 5:
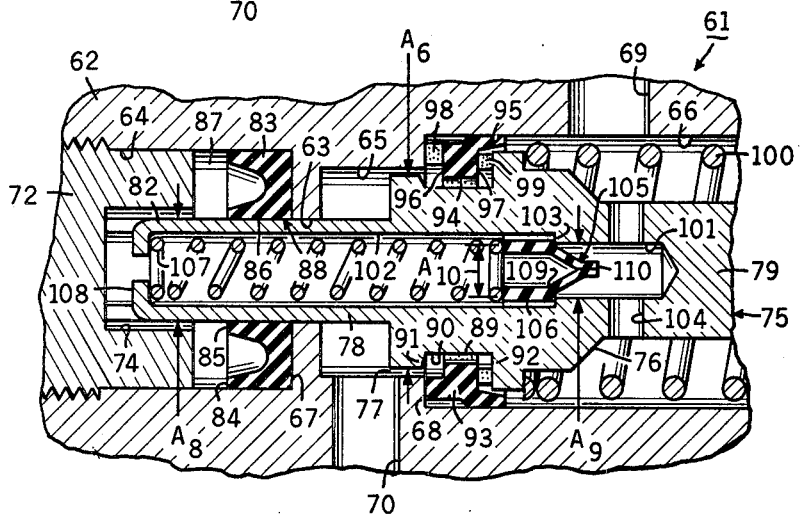
Figure 5:
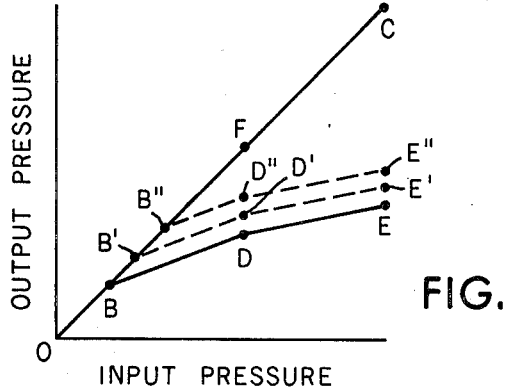

Referring now to the drawings and in particular to FIGS. 1 and 2, a control or proportioning valve 1 is provided with a housing 2 having a bore 3 therein coaxially aligned with stepped counterbores 4, 5, and shoulders 6, 7 are respectively provided on said housing at the juncture of the bore and counterbore 3, 4 and at the juncture of the counterbores 4, 5, respectively, said shoulder 7 having a valve seat 8 defined thereon. An inlet port 9 which is adapted for connection with a master cylinder is provided in the housing 2 intersecting with the counterbore 4, and an outlet port 10 which is adapted for connection with the vehicle rear brake motors is provided in said housing 2 intersecting with the counterbore 5 adjacent to the mid-portion thereof. A closure member or end plug 11 is threadedly received in the open end of the counterbore 5, and a bore 12 is provided in said closure member in axial alignment with stepped counterbores 13, 14. Shoulders 15, 16 are provided on the closure member 11 at the juncture of the bore and counterbores 12, 13 and at the juncture of the counterbores 13, 14, respectively, and a seating member or retainer 17 having a central aperture 18 therein is received in the closure member counterbore 14 and maintained in engagement with the shoulder 16 by a snap ring and groove assembly 19 which is fixedly received in the closure member counterbore 14. A valve member or seal 20 is normally seated in engagement with the retainer 17 having an annular outer lip 21 in sealing engagement with the closure member counterbore 13 and an annular inner lip 22 defining a central aperture 23 through said valve member for sealing engagement with a metering or proportioning member, such as the piston 24.

The piston 24 is provided with a rightward end portion 25 which extends through the retainer end and valve member apertures 18, 23 in sealing engagement with the valve member inner lip 22 into the closure member bore 12, and a chamber 26 is defined in the closure member bore and counterbore 12, 13 between said closure member 11 and said piston rightward end 25 and valve member 20, said chamber being connected in pressure fluid communication with the housing counterbore 5 by a passage, indicated generally at 26a, which is defined between the peripheral portion of the piston rightward end and the apertures 18, 23 of said retainer and valve member, as discussed hereinafter. The piston 24 extends coaxially through the housing counterbores 4, 5 having a leftward end portion 27 slidably received in the housing bore 3, and a peripheral seal 28 is carried in said piston leftward end portion in sealing engagement with said housing bore.

An annular flange member 29 is integrally provided on the piston 24 adjacent the mid-portion thereof and spaced from the housing valve seat 8, and another valve member 30 is normally positioned on the piston flange 29 for sealing engagement with the housing valve seat 8. Another annular flange member 31 is also provided on the piston 24 for abutting engagement with the interior end of the closure member 11, and a metering or proportioning spring 32 is pre-compressed between the housing shoulder 7 and the piston flange 31 normally urging said piston flange into abutting engagement with said closure member interior end and urging the valve member 30 toward a position disengaged from the housing valve seat 8.

Stepped passages or bores 33, 34 having an annular shoulder 35 defining a valve seat 35 therebetween are provided in the piston 24, and a cross-passage 36 has one end intersecting with the smaller stepped passage 33 while the other end thereof is in open pressure fluid communication with the inlet port 9, said larger stepped passage 34 intersecting with the rightward or free end of the piston 24 and being in open pressure fluid communication with the chamber 26. A metering or valve member 37 is slidably received in the piston stepped passage 34 having a plurality of grooves or passages 38 in its periphery extending axially thereacross, and a metering spring 39 interposed between said valve member and a retainer 40 provided in the rightward end of the piston stepped passage 28 normally urges said valve member into sealing engagement with the piston valve seat 35 interrupting pressure fluid communication between the inlet port 9 and the chamber 26. A return flow passage 41 is provided through the valve member 36, and said return flow passage is normally closed by the sealing engagement of an expandable lip portion 42 integrally provided on said valve member and defining a unidirectional or check valve permitting pressure fluid flow through said return flow passage only from the larger stepped passage 34 to the smaller stepped passage 33.

It should be noted that the piston 24 is provided with an effective area $A_1$ which is substantially defined by the cross-sectional sealing engagement of the piston seal 28 with the housing bore 3 and another effective area $A_2$ which is substantially defined by the sealing engagement of the valve member 30 with the housing valve seat 8. Another area $A_3$ is also provided on the piston 24 substantially defined by the sealing engagement of the inner lip 22 of the valve member 20 with the piston rightward portion 25 and being subjected to the fluid pressure in the chamber 26. To complete the description of the control valve 1, opposed substantially equal effective areas $A_4$, $A_5$ are provided on the valve member 37 defined by the sealing engagement of said valve member with the piston valve seat and subjected to the fluid pressure at the inlet port 9 and in the chamber 26, respectively.

In the operation with the component parts of the control valve 1 in their normal or inoperative positions, as shown, input fluid pressure $P_1$ supplied to the inlet port 9 from the master cylinder (not shown) flows through the housing counterbores 4, 5 to establish an applied or output fluid pressure $P_2$ at the outlet port 10 in a predetermined ratio with the input fluid pressure $P_1$, as shown along the line OB in the graph of FIG. 3. At the same time, the fluid pressure also flows from the housing counterbore 5 through the passage 26a acting on the inner lip 22 of the valve member 20 to effect displacement thereof from the piston rightward end 25 into the housing chamber 26 to also establish a fluid pressure $P_3$ in said chamber having a magnitude substantially equal to that of the output fluid pressure $P_2$. In this manner, the chamber fluid pressure $P_3$ acts on the effective area $A_1$ of the piston 24 to establish a closing force $P_3A_1$ urging the piston 24 leftwardly against the compressive force $Fs$ of the metering spring 32, and when the input, output and chamber fluid pressures $P_1$, $P_2$ and $P_3$ are increased to the predetermined value B, as shown in the graph of FIG. 3, the closing force $P_3A_1$ moves the piston 24 leftwardly toward an isolating position engaging the valve member 30 with the housing valve seat 8 to isolate the input fluid pressure $P_1$ from the output and chamber fluid pressure $P_2$, $P_3$ and interrupt pressure fluid communication between the inlet and outlet ports 9, 10. With the valve member 30 engaged with the housing valve seat 8, the closing force $P_3A_1$ is replaced by the output fluid pressure $P_2$ acting on the difference between the areas $A_2$, $A_3$ and the chamber fluid pressure $P_3$ acting on the area $A_3$ to establish an output force $P_2(A_2-A_3)+P_3A_3$ for maintaining said valve member engaged with said housing valve seat, and so long as the output and chamber fluid pressures $P_2$, $P_3$ are equal, as set forth hereinbefore, it is obvious that the output force $P_2(A_2-A_3)+P_3A_3$ is the same as or equal to $P_2A_2$; therefore, the input fluid pressure $P_1$ acts on the difference between the effective areas $A_1$, $A_2$ to establish an input force $P_1(A_2-A_1)$ which is additive to the spring force $Fs$ and opposed to the output force $P_2A_2$. When the input fluid pressure $P_1$ is increased along the line OC in the graph of FIG. 3 to values in excess of the predetermined value B but less than the predetermined value F, the increased input force $$P_1(A_2-A_1)$$

assisted by the spring force $Fs$ urges the piston 24 rightwardly toward a metering position against the opposing output force $P_2A_2$. This rightward movement of the piston 24 disengages the valve member 30 from the housing valve seat 8 to establish metered pressure fluid communication between the inlet and outlet ports 9, 10 and effect a metered increase of the output fluid pressure $P_2$ in another predetermined ratio with the input fluid pressure $P_1$ between the predetermined values B and D, as shown along the line BD in the graph of FIG. 3, said other ratio being defined by the following equation:

$$P_2 = \frac{P_1(A_2-A_1)+Fs}{A_2}$$

The proportional increase in the output fluid pressure $P_2$ effects a corresponding increase in the output force $P_2A_2$, and when the increased output force $P_2A_2$ attains a value substantially equal to the opposing increased input force $P_1(A_2-A_1)$ and the additive spring force $Fs$, the piston 24 is again moved leftwardly to its isolating or interrupting position re-engaging the valve element 30 with the housing valve seat 8 to again interrupt pressure fluid communication between the inlet and outlet ports 9, 10.

The input fluid pressure $P_1$ also flows through the cross-passage 36 and stepped passage 33 of the piston 24 acting on the input area $A_4$ of the valve member 37 to establish an input force $P_1A_4$, and the chamber fluid pressure $P_3$ in the housing chamber 26 also flows into the stepped passage 34 of said piston acting on the output area $A_5$ of said valve member to establish an output force $P_3A_5$ which is opposed to the input force $P_1A_4$ and additive to the compressive force $Fc$ of the metering spring 39. When the input fluid pressure $P_1$ is increased along the line OC in the graph of FIG. 3 to values in excess of the predetermined value F, the increased input force $P_1A_4$ urges the valve member 37 rightwardly against the additive output and spring forces $P_3A_5$ and $Fc$ toward a metering position disengaged from the piston valve seat 35 to establish metered pressure fluid communication between the inlet port 9 and the chamber 26 through the stepped passages 33, 34, and effect a metered increase in the chamber fluid pressure $P_3$ in the following ratio with the input fluid pressure $P_1$ in excess of the predetermined value F:

$$P_3 = \frac{P_1A_4-F_c}{A_5}$$

In this manner, fluid pressure flows from the housing counterbore 4 through the piston cross-passage 36 and smaller stepped passage 33 and therefrom through the valve member peripheral grooves 38 and the piston larger stepped passage 34 into the chamber 26. This metered increase of the fluid pressure $P_3$ in the chamber 26 now increases the magnitude thereof to a value in excess of the magnitude of the output fluid pressure $P_2$ creating a pressure fluid differential between the housing counterbore 5 and the chamber 26 across the valve member 20 which is effective to sealably engage the inner lip 22 of the valve member 20 with the piston rightward end 25 closing the passage 26a and interrupting pressure fluid communication between said housing counterbore and chamber. The metered increase in the chamber fluid pressure $P_3$ effects a corresponding increase in the output force $P_3A_5$, and when the increased output force $P_3A_5$ and the additive spring force Fc attain a value substantially equal to the input force $P_1A_4$, the valve member 37 is moved leftwardly to its interrupting position re-engaging the piston valve seat 35 to again interrupt pressure fluid communication between the inlet port 9 and the chamber 26. Since the output and chamber fluid pressures $P_2$, $P_3$ now have different magnitudes, the output force $P_2(A_2-A_3)+P_3A_3$, as defined hereinbefore, is now effective to oppose movement of the piston 24 in response to the additive input and spring forces $P_1(A_2-A_1)$ and Fs; therefore, the output fluid pressure $P_2$ is increased along the line DE in the graph of FIG. 3 in another predetermined ratio with the input fluid pressure $P_1$ in excess of the predetermined value F, as illustrated by the following equation:

$$P_2=\frac{P_1(A_2-A_1)+Fs-P_3A_3}{A_2-A_3}$$

The proportional increases in the output fluid pressure $P_2$ and the chamber fluid pressure $P_3$ effect a corresponding increase in the output force $P_2(A_2-A_3)+P_3A_3$, and when the increased output force $P_2(A_2-A_3)+P_3A_3$ attains a value substantially equal to the opposing input and spring forces $P_1(A_2-A_1)$ and Fs, the piston 24 is moved leftwardly to its isolating position re-engaging the valve member 30 with the housing valve seat 8.

When the desired braking effort is attained, the master cylinder is de-actuated to eliminate the input fluid pressure $P_1$, and when the input fluid pressure $P_1$ is so decreased along the line OC in the graph of FIG. 3 below the value of the chamber fluid pressure $P_3$, a fluid pressure differential is established across the valve member 37 effecting movement of the lip portions 42 thereof to an open position permitting the return flow of the pressure fluid in the chamber 26 through the piston stepped passages 35, 34 and the valve member return flow passage 41, the piston cross-passage 36 and the housing counterbore 4 to the inlet port 9. This return flow, of course, reduces the magnitude of the chamber fluid pressure $P_3$, and when the magnitude thereof is so reduced to a value less than that of the output fluid pressure $P_2$, the output fluid pressure $P_2$ acts on the inner sealing lip 22 of the valve member 20 to effect displacement thereof from sealing engagement with the piston rightward portion 25 to again open the passage 26a. In this manner, the output fluid pressure $P_2$ flows from the outlet port 10 through the housing counterbore 5 and the passage 26a into the chamber 26 and therefrom to the inlet port 9 through the piston passages 33, 34 and the valve member return flow passage 41, as described hereinbefore. When the output and chamber fluid pressures $P_2$, $P_3$ are so reduced with the input fluid pressure $P_1$ to a value less than the predetermined value B, the reduced input force $P_1(A_2-A_1)$ and additive spring force Fs overcomes the reduced output force $P_2A_2$ and moves the piston 24 to its original position with the piston flange 31 engaged with the interior end of the closure member 11 and the valve member 30 disengaged from the housing valve seat 8 re-establishing open pressure fluid communication between the inlet and outlet ports 9, 10.

Referring now to FIG. 4, a control valve 51 is shown having the same component parts and functioning in the same manner as the previously described control valve 1 with the following exceptions.

In the control valve 51, a control or air spring port 52 is provided in the housing 2 intersecting with the end wall of the housing bore 3, said control port 52 being adapted for connection with the air spring of a vehicle air suspension system (not shown) of a type well known in the art, and the area $A_1$ of the piston 24 is subjected to the control or air spring fluid pressure $P_4$ at the control port 52.

In the operation of the control valve 51, it is obvious that, in the absence of control fluid pressure $P_4$ at the control port 52, the function of the control valve 51 is the same as that of the previously described control valve 1, as shown in the graph of FIG. 5. When the control fluid pressure $P_4$ is established at the control port 52, it acts on the piston area $A_1$ to establish a control force $P_4A_1$ which is additive to the input and spring forces $P_1(A_2-A_1)$ and Fs to actuate the piston 24 to its metering position and effect proportional increases along one of many incrementally variable lines parallel to the line BD, such as for instance the dashed line B'D' in the graph of FIG. 5, in the ratio $$P_2=\frac{P_1(A_2-A_1)+Fs+P_4A_1}{A_2}$$

and also parallel to the line DE, such as for instance the dashed line D'E', in the ratio $$P_2=\frac{P_1(A_2-A_1)+Fs+P_4A_1-P_3A_3}{A_2-A_3}$$

As the vehicle load is further increased, the control fluid pressure $P_4$ also increases to effect an increased control force $P_4A_1$, and such increases in the control force $P_4A_1$ are additive to the input and spring forces $P_1(A_2-A_1)$ and Fs to establish a proportionally increased output fluid pressure $P_2$ in the same manner as previously described hereinbefore and as illustrated along the dashed line B''D'' and D''E'' in the graph of FIG. 5. From the foregoing, it is obvious that variations in the control fluid pressure $P_4$ not only proportionally alters the output fluid pressure $P_2$ but also alters the predetermined values B and E at which the proportioning functions of the control valve 41 occur. In other words, the output fluid pressure $P_2$ is proportionally variable with the vehicle load condition of magnitude in order to proportionally vary the braking effort of the vehicle with regard to said vehicle load.

Referring now to FIGS. 6 and 7, another control valve 61 is provided with a housing 62 having a bore 63 therein interposed between a counterbore 64 and stepped counterbores 65, 66, and shoulders 67, 68 are provided at the juncture of said bore 63 and counterbore 64 and at the juncture of said stepped counterbores 65, 66, respectively. An inlet port 69 which is adapted for connection with a master cylinder (not shown) is provided in the housing 62 intersecting with the counterbore 66, and an outlet port 70 which is adapted for connection with a vehicle brake motor (not shown) is also provided in said housing intersecting with the counterbore 65. Closure members 71, 72 are threadedly received in the open ends of the counterbores 64, 66 defining end walls thereof, and said closure members are provided with blind bores 73, 74 which connect with the housing counterbores 66, 64 respectively.

A proportioning or metering member, such as the piston indicated generally at 75, is provided with an enlarged or head portion 76 loosely guided in the housing counterbore 65 and defining therewith an annular passage 77, and opposed leftward and rightward extensions 78, 79 are integrally provided on said piston head 76. The piston extension 79 extends coaxially through the housing counterbore 66 having an end portion 80 slidably received in the closure member bore 73, and a peripheral seal 81 is carried therein in sealing engagement with said closure member bore. The piston extension 78 is slidably received in the housing bore 63 and extends coaxially through the housing counterbore 67 having an end portion 82 extending into the closure member bore 74 for abutting engagement with the end wall thereof. A seal or valve member 83 is normally seated in engagement with the housing shoulder 67 having an outer annular lip 84 in sealing engagement with the housing counterbore 64 and having an inner annular lip 85 defining a central aperture 86 through said valve member in sealing engagement with the piston extension 82. A chamber 87 is defined in the housing bore 64 and closure member bore 74 between the closure member 72 and the piston extension 78 and valve member 83, said chamber being connected in pressure fluid communication with the housing counterbore 65 and outlet port 70 by a passage, indicated generally at 88, which is defined between the peripheral portion of the piston extension 78 and said valve member aperture 86 and housing bore 63, as discussed hereinafter.

A peripheral groove 89 is provided in the piston head 76 having a base wall 90 interposed between opposed side walls 91, 92, and an annular seal or valve member 93 is received in said groove. The valve member 93 is provided with an annular base portion 94 radially spaced from the groove base wall 90 and an annular outer sealing lip 95 in sealing engagement with the housing counterbore 66 and opposed faces or sides 96, 97 interconnecting said base portion and sealing lip and opposed to the groove side walls 91, 92, respectively. A plurality of annularly spaced abutments 98, 99 are respectively provided on the opposed faces 96, 97 of the valve member 93 for abutting engagement with the housing shoulder 68 and the groove side wall 92. A proportioning or metering spring 100 is precompressed between the piston head 76 and the closure member 71 urging the groove side wall 92 into abutting engagement with the abutments 99 on the valve member face 97, the abutments 98 on the valve member leftward face 96 into engagement with the housing shoulder 68, and the leftward end portion 82 of the piston extension 78 toward engagement with the end wall of the closure member bore 74.

Stepped bores or passages 101, 102 having an annular shoulder 103 defining a valve seat therebetween are axially provided in the piston 75, and a cross-passage 104 in the piston extension 79 connects the smaller stepped passage 101 in pressure fluid communication with the inlet port 69 while the larger stepped passage 102 intersects with the leftward end 82 of the piston leftward extension 78, said larger stepped passage being in open pressure fluid communication with the housing chamber 87. A metering or valve member 105 is slidably received in the piston stepped passage 102 having a plurality of grooves or passages 106 in its periphery extending axially thereacross, and a metering spring 107 is interposed between said valve member and a plurality of retaining ears 108 slotted from the leftward end portion 82 of the piston leftward extension 78, said metering spring normally urging said valve member into sealing engagement with the piston valve seat 103 interrupting pressure fluid communication between the inlet port 69 and the chamber 87. A return flow passage 109 is provided through the valve member 105, and said return flow passage is normally closed by the sealing engagement of an expandable lip portion 110 provided on said valve member and defining a unidirectional or check valve permitting pressure fluid flow through said return flow passage only from the larger stepped passage 102 to the smaller stepped passage 101.

When the piston free or leftward end portion 82 is biased into engagement with the end wall of the closure member bore 74, as shown, the piston 75 is in its inoperative position, and the groove side wall 91 which defines an annular valve seat is spaced from engagement with its cooperating face 96 of the valve member 93. The sealing engagement of the valve seat 91 with the valve member face 96 defines an effective area $A_6$ on the piston head 76, and the piston extension 79 is provided with another effective area $A_7$ substantially defined by the sealing engagement of the extension seal 81 with the closure member bore 73 and is predeterminately less than the area $A_6$. The piston extension 78 is also provided with an effective area $A_8$ which is substantially defined by the sealing engagement of said piston extension with the inner sealing lip 85 of the sealing member 83, said area $A_8$ being predeterminately less than the area $A_6$ and also $A_7$ and subjected to the fluid pressure in the housing chamber 87. To complete the description of the control valve 61, opposed substantially equal effective areas $A_9$, $A_{10}$ are also provided on the valve member 105 substantially defined by the seating engagement thereof with the piston valve seat 103 and respectively subjected to the fluid pressure at the inlet and outlet ports 69, 70.

In the operation with the component parts of the control valve 61 in their inoperative or normal positions, as shown, the input fluid pressure $P_1$ supplied to the inlet port 69 from the master cylinder (not shown) flows through the housing counterbore 66, the passage defined between the piston groove 89 and the valve member 93, the annular passage 77 and the housing counterbore 65 to establish an applied or output fluid pressure $P_2$ at the outlet port 70 in a predetermined 1:1 ratio with the input fluid pressure at said inlet port, as shown along the line OB in the graph of FIG. 3. At the same time, the fluid pressure also flows from the housing counterbore 65 through the passage 88 acting on the inner lip 85 of the valve member 83 to effect displacement thereof from the piston extension 78 into the housing chamber 87 to also establish a fluid pressure $P_3$ in said chamber having a magnitude substantially equal to that of the output fluid pressure $P_2$. In this manner, the chamber fluid pressure $P_3$ acts on the effective area $A_8$ of the piston 75 to establish a closing force $P_3A_8$ urging the piston 75 rightwardly against the compressive force $Fs$ of the metering spring 100, and when the input, output and chamber fluid pressures $P_1$, $P_2$ and $P_3$ are increased to the predetermined value B, as shown in the graph of FIG. 3, the closing force $P_3A_8$ moves the piston 75 rightwardly toward an isolating position engaging the piston valve seat 91 with the valve member face 96 to isolate the input fluid pressure $P_1$ from the output and chamber fluid pressures $P_2$, $P_3$ and interrupt pressure fluid communication between the inlet and outlet ports 69, 70. With the piston valve seat 91 engaged with the valve member face 96, the closing force $P_3A_8$ is replaced by the output fluid pressure $P_2$ acting on the difference between the areas $A_6$, $A_8$ and the chamber fluid pressure $P_3$ acting on the area $A_8$ to establish an output force $P_3A_8+P_2(A_6-A_8)$ for maintaining said piston valve seat 91 engaged with said valve member face 96, and so long as the output and chamber fluid pressures $P_2$, $P_3$ are equal, as set forth hereinbefore, it is obvious that the output force $P_3A_8+P_2(A_6-A_8)$ is the same or equal to $P_2A_6$; therefore, the input fluid pressure $P_1$ acts on the difference between the areas $A_6$ and $A_7$ to establish an input force $P_1(A_6-A_7)$ which is additive to the spring force $Fs$ and opposed to the output force $P_2A_6$. When the input fluid pressure $P_1$ is increased along the line OC in the graph of FIG. 3 to values in excess of the predetermined value B but less than the predetermined value F, the increased input force $P_1(A_6-A_7)$ assisted by the spring force $Fs$ urges the piston 75 leftwardly toward a metering position against the opposing output force $P_2A_6$. This leftward movement of the piston 75 disengages the valve seat 91 thereof from the valve member face 96 to establish metered pressure fluid communication between the inlet and outlet ports 69, 70 and effect a metered increase of the output fluid pressure $P_2$ in another predetermined ratio with the input fluid pressure $P_1$ between the predetermined values B and D, as shown along the line BD in the graph of FIG. 3, said other ratio being defined by the following equation:

$$P_2 = \frac{P_1(A_6 - A_7) + Fs}{A_6}$$

The proportional increase in the output fluid pressure $P_2$ effects a corresponding increase in the output force $P_2A_6$, and when the increased output force $P_2A_6$ attains a value substantially equal to the opposing increased input force $P_1(A_6-A_7)$ and the additive spring force $Fs$, the piston 75 is again moved rightwardly to its isolating or interrupting position re-engaging the valve seat 91 thereof with the valve member face 96 to again interrupt pressure fluid communication between the inlet and outlet ports 69, 70.

The input fluid pressure $P_1$ also flows through the cross-passage 104 and stepped passage 101 of the piston 75 acting on the input area $A_9$ of the valve member 105 to establish an input force $P_1A_9$, and the chamber fluid pressure $P_3$ in the housing chamber 87 also flows into the stepped passage 102 of said piston acting on the output area $A_{10}$ of said valve member to establish an output force $P_3A_{10}$ which is opposed to the input force $P_1A_9$ and additive to the compressive force $Fc$ of the metering spring 107. When the input fluid pressure $P_1$ is increased along the line OC in the graph of FIG. 3 to values in excess of the predetermined value F, the increased input force $P_1A_9$ urges the valve member 105 leftwardly against the additive output and spring forces $P_3A_{10}$ and $Fc$ toward a metering position disengaged from the piston valve seat 103 to establish metered pressure fluid communication between the inlet port 9 and the housing chamber 87 and effect a metered increase in the chamber fluid pressure $P_3$ in the following ratio with the input fluid pressure $P_1$ in excess of the predetermined value F:

$$P_3 = \frac{P_1A_9 - F_c}{A_{10}}$$

In this manner, pressure fluid flows from the housing counterbore 66 through the piston cross-passage 104 and smaller stepped passage 101 and therefrom through the valve member peripheral grooves 106 and the piston larger stepped passage 102 into the chamber 87. This metered increase of the fluid pressure $P_3$ in the chamber 87 now increases the magnitude thereof to a value in excess of the magnitude of the output fluid pressure $P_2$ creating a pressure differential between the housing counterbore 65 and the chamber 87 across the valve member 83 which is effective to sealably engage the inner lip 85 of the valve member 83 with the piston extension 78 closing the passage 88 and interrupting pressure fluid communication between said housing counterbore and said chamber. The metered increase in the chamber fluid pressure $P_3$ effects a corresponding increase in the output force $P_3A_{10}$, and when the increased output force $P_3A_{10}$ and the additive spring force $Fc$ attain a value substantially equal to the input force $P_1A_9$, the valve member 105 is moved rightwardly to its interrupting position re-engaging the piston valve seat 103 to again interrupt pressure fluid communication between the inlet port 9 and the chamber 87. Since the output and chamber fluid pressures $P_2$, $P_3$ now have different magnitudes, the output force $P_3A_8+P_2(A_6-A_8)$, as defined hereinbefore, is now effective to oppose movement of the piston 75 in response to the opposing input and spring forces $P_1(A_6-A_7)$ and $Fs$; therefore, the output fluid pressure $P_2$ is now increased along the line DE in the graph of FIG. 3 in another predetermined ratio with the input fluid pressure $P_1$ in excess of the predetermined value F, as illustrated by the following equation:

$$P_2 = \frac{P_1(A_6 - A_7) + Fs - P_3A_8}{A_6 - A_8}$$

The proportional increases in the output fluid pressure $P_2$ and the chamber fluid pressure $P_3$ effect a corresponding increase in the output force $P_2(A_6-A_7)+P_3A_8$, and when the increased output force $P_2(A_6-A_7)+P_3A_8$ attains a value substantially equal to the opposing input and spring forces $P_1(A_6-A_7)$ and $Fs$, the piston 75 is moved rightwardly to its isolating position re-engaging the valve seat 91 thereof with the valve member face 96.

When the desired braking effort is attained, the master cylinder is de-actuated to eliminate the input fluid pressure $P_1$, and when the input fluid pressure $P_1$ is so decreased along the line OC in the graph of FIG. 3 below the value of the output and chamber fluid pressures $P_2$, $P_3$, a fluid pressure differential is established across the valve members 93, 105. The fluid pressure differential across the valve member 93 acts on the sealing lip 95 thereof to effect disengagement of said sealing lip from the housing counterbore 66 to permit pressure fluid flow from the outlet port 70 through the housing counter bore 66, the annular passage 77, and the passage between the valve member leftward face 96 and the housing shoulder 68 past the collapsed sealing lip 95 of said valve member into the housing counterbore 66 and therefrom to the inlet port 69. The fluid pressure differential established across the valve member 105 effects movement of the lip portions 110 thereof to an open position permitting the return flow of the pressure fluid in the chamber 87 through the piston stepped passages 102, 101 and the valve member return flow passage 109, the piston cross-passage 104 and the housing counterbore 66 to the inlet port 9. When the output and chamber fluid pressures $P_2$, $P_3$ are are so reduced with the input fluid pressure $P_1$ to a value less than the predetermined value B, the reduced input force $P_1(A_6-A_7)$ and the additive spring force $Fs$ overcomes the reduced output force $P_2A_6$ and moves the piston 75 to its original position reestablishing open pressure fluid communication between the inlet and outlet ports 69, 70.

The embodiments of the invention in which an exclusive property or privilege is claimed are defined as follows:

1. An control valve comprising a housing, first means movable in said housing in response to fluid pressure supplied thereto in excess of a first predetermined value toward a metering position to establish an applied fluid pressure in a predetermined ratio with the supplied fluid pressure in excess of the predetermined value including second means defining with said housing a fluid pressure chamber, and third means controlling pressure fluid communication between the supplied fluid pressure and said chamber and movable in response to the supplied fluid pressure in excess of another predetermined value greater than the first named predetermined value to effect a metered increase in the fluid pressure in said chamber, the increased fluid pressure in said chamber acting on said second means to oppose further movement of said first means in response to the supplied fluid pressure in excess of the other predetermined value toward its metering position to effect a further metered increase in the applied fluid pressure in another predetermined ratio with the supplied fluid pressure in excess of the other predetermined value.

2. The control valve according to claim 1, comprising fourth means controlling pressure fluid communication between the applied fluid pressure and said chamber and movable to effect pressure fluid communication therebetween only when the magnitude of the applied fluid pressure exceeds that of the fluid pressure in said chamber, the magnitude of the fluid pressure in said chamber being increased in excess of that of the applied fluid pressure upon the actuation of said third means in response to the supplied fluid pressure in excess of the other predetermined value.

3. The control valve according to claim 1, comprising opposed differential areas on said first means respectively subjected to the supplied and applied fluid pressures, said first means being movable toward its metering position in response to the supplied fluid pressure in excess of the first named predetermined value and in excess of the other predetermined value acting on one of said differential areas to effect the metered increases in the applied fluid pressure therewith in the first named and other predetermined ratios, and the other of said differential areas being acted upon by the applied fluid pressure and assisted by the fluid pressure in said chamber acting on said second means to oppose the movement of said first means toward its metering position.

4. The control valve according to claim 3, wherein said other differential area is greater than said one differential area.

5. The control valve according to claim 3, comprising a third area on said second means subjected to the fluid pressure in said chamber, said third area being additive to said other differential area.

6. The control valve according to claim 4, comprising a third area on said second means subjected to the fluid pressure in said chamber, said third area being additive to said other differential area and being greater than the difference between said one and other differential areas.

7. The control valve according to claim 1, wherein said first means includes resiliently urged means normally establishing the applied fluid pressure in a third predetermined ratio different than the first named predetermined ratio with the supplied fluid pressure up to the first named predetermined value thereof and said resiliently urged means being movable against its own force in response to the supplied and applied fluid pressures of the first named predetermined value toward a position isolating the supplied and applied fluid pressures, and said resiliently urged means being thereafter actuated in response to the increased supplied fluid pressure between the first named and other predetermined values and in excess of the other predetermined value toward its metering position to effect the metered increases in the applied fluid pressure therewith in the first named and other predetermined ratios, respectively.

8. The control valve according to claim 1, wherein said third means includes resiliently urged means normally interrupting pressure fluid communication between the supplied fluid pressure and said chamber, said resiliently urged means being movable in response to the supplied fluid pressure in excess of the other predetermined value toward a metering position to effect the metered increase of the fluid pressure in said chamber.

9. The control valve according to claim 7, wherein said third means includes other resiliently urged means movable in said first named resiliently urged means and normally interrupting pressure fluid communication between the supplied fluid pressure and said chamber, said other resiliently urged means being movable in response to the supplied fluid pressure in excess of the other predetermined value toward a metering position to effect the metered increase of the fluid pressure in said chamber.

10. The control of valve according to claim 7, comprising uni-directional means controlling pressure fluid communication between the applied fluid pressure and said chamber and movable to effect an increase in the fluid pressure in said chamber only when the magnitude of the applied fluid pressure exceeds that of the fluid pressure in said chamber, the fluid pressure in said chamber being increased to a magnitude in excess of that of the applied fluid pressure upon actuation of said third means.

11. The control valve according to claim 9, comprising valve means controlling pressure fluid communication between the applied fluid pressure and said chamber, said valve means being movable to effect an increase in the fluid pressure in said chamber only in response to the applied fluid pressure acting thereon and having a magnitude in excess of that of the fluid pressure in said chamber, the magnitude of the fluid pressure in said chamber being increased in excess of that of the applied fluid pressure upon actuation of said other resiliently urged means toward its metering position.

12. The control valve according to claim 11, comprising first and second opposed areas on said first named resiliently urged means respectively subjected to the supplied and applied fluid pressures, said first named resiliently urged means being movable to its isolating position in response to the supplied and applied fluid pressures of the first named predetermined value respectively acting on said first and second areas and said resiliently urged means being movable from its isolating position toward its metering position in response to the increased supplied fluid pressures between the first named and other predetermined values and in excess of the other predetermined value acting on said first area to effect the metered increases in the applied fluid pressure in the first named and other predetermined ratios, the applied fluid pressure acting on said second area to oppose movement of said first named resiliently urged means toward its metering position, and a third area on said second means subjected to the fluid pressure in said chamber and additive to said second area, the fluid pressure in said chamber acting on said third area to also oppose movement of said first named resiliently urged means toward its metering position.

13. The control valve according to claim 12, wherein said second area is greater than said first area.

14. The control valve according to claim 13, wherein said third area is greater than the difference between said first and second areas.

15. The control valve according to claim 2, wherein said first means includes resiliently urged means normally establishing the applied fluid pressure in a third predetermined ratio with the supplied fluid pressure up to the first named predetermined value thereof and said resiliently urged means being movable in response to the supplied and applied fluid pressures of the first named predetermined ratio toward a position isolating the supplied fluid pressure from the applied fluid pressure, and said resiliently urged means being thereafter actuated in response to the increased supplied fluid pressure between the first named and other predetermined values and in excess of the other predetermined value toward its metering position to effect the metered increases in the applied fluid pressure therewith in the first named and other predetermined ratios, respectively; said third means including other resiliently urged means normally interrupting pressure fluid communication between the supplied fluid pressure and said chamber, said other resiliently urged means being movable in response to the supplied fluid pressure in excess of the other predetermined value toward a metering position to effect the metered increase of the fluid pressure in said chamber; and said fourth means including uni-directional valve means defining with said housing and said first named resiliently urged means passage means for the passage of the applied fluid pressure into said chamber, said unidirectional valve means being movable toward a position opening said passage means only when the magnitude of the applied fluid pressure acting on said unidirectional valve means exceeds that of the fluid pressure in said chamber also acting thereon in opposition to the applied fluid pressure.

16. The control valve according to claim 15, comprising a first area on said first named resiliently urged means subjected to the supplied fluid pressure, second and third areas on said first named resiliently urged means opposed to said first area and subjected to the applied fluid pressure and the fluid pressure in said chamber, respectively, said first named resiliently urged means normally establishing the applied fluid pressure and the fluid pressure in said chamber in a third predetermined ratio with the supplied fluid pressure up to the first named predetermined value thereof and said first named resiliently urged means being movable against its own force in response to the supplied fluid pressure, the applied fluid pressure and the fluid pressure in said chamber of the first named predetermined value respectively acting on said first, second and third areas toward a position isolating the supplied fluid pressure from the applied fluid pressure and the fluid pressure in said chamber, said first named resiliently urged means being actuated toward its metering position in response to the increased supplied fluid pressure between the first named and other predetermined values acting on said first area and assisted by its own force to effect the metered increases in the applied fluid pressure and the fluid pressure in said chamber respectively acting on said second and third areas in the first named predetermined ratio therewith, fourth and fifth opposed areas on said other resiliently urged means subjected to the supplied fluid pressure and the fluid pressure in said chamber, respectively, said other resiliently urged means being movable against its own force and the fluid pressure in said chamber acting on said fourth area toward a metering position in response to the supplied fluid pressure in excess of the other predetermined value acting on said fifth area to effect the metered increase in the magnitude of the fluid pressure in said chamber to a value greater than that of the applied fluid pressure, and said first named resiliently urged means being thereafter further movable against the increased applied fluid pressure acting on said second area and the increased fluid pressure in said chamber having a magnitude in excess of the applied fluid pressure and acting on said third area in response to the increased supplied fluid pressure in excess of the other predetermined value and assisted by its own force to effect the metered increase in only the applied fluid pressure in the other predetermined ratio therewith.

17. The control valve according to claim 16, wherein said second area is greater than either of said first or third areas and said third area is greater than said first area.

18. The control valve according to claim 16, comprising inlet and outlet ports in said housing for receiving the supplied and applied fluid pressures; a first valve seat on said housing between said inlet and outlet ports; said first named resiliently urged means including piston means movable in said housing, said first and second areas being defined on said piston means and respectively subjected to the supplied and applied fluid pressures at said inlet and outlet ports, extension means on said piston means defining with said housing said chamber, said third area being defined on said extension means and subjected to the fluid pressure in said chamber, second valve means on said piston means for engagement with said first valve seat when said piston means is in its isolating position, first resilient means normally urging said second valve means from engagement with said first valve seat to establish open pressure fluid communication between said inlet and outlet ports, said piston means being movable against said first resilient means toward its isolating position to engage said second valve means with said first valve seat when the supplied and applied fluid pressures attain the first named predetermined value and said piston means also being assisted by said first resilient means upon movement toward it metering position to disengage said second valve means from said first valve seat and establish metered pressure fluid communication between said inlet and outlet ports when the supplied fluid pressure exceeds the first named and other predetermined values, second passage means in said piston means between said inlet port and said chamber, and a second valve seat on said piston means about said second passage means; said other resiliently urged means including third valve means movable in said second passage means for engagement with said second valve seat, said fourth and fifth areas being defined on said third valve means and respectively subjected to the supplied fluid pressure at said inlet port and the fluid pressure in said chamber, and second resilient means urging said third valve means into engagement with said second valve seat to normally interrupt pressure fluid communication between said inlet port and said chamber, said third valve means being movable against said second resilient means toward its metering position disengaged from said second valve seat to establish metered pressure fluid communication between said inlet port and said chamber when the supplied fluid pressure exceeds the other predetermined value; said first passage means being defined between said extension means and housing and having opposed ends connected in open pressure fluid communication with said outlet port and chamber; and said uni-directional valve means including a sealing member in said first passage means and engaged between said housing and said extension means to normally close said first passage means, said sealing member being movable to its open position in said first passage means to permit pressure fluid flow therethrough only from aid outlet port to said chamber when the magnitude of the applied fluid pressure at said outlet port acting on said sealing member exceeds that of the fluid pressure in said chamber also acting thereon in opposition to the applied fluid pressure.

References Cited
UNITED STATES PATENTS

| | | | |
|---|---|---|---|
| 3,360,004 | 12/1967 | Lewis et al. | 137—493 |
| 3,385,637 | 5/1968 | Kersting. | |
| 3,388,950 | 6/1968 | Stelzer. | |
| 3,394,546 | 7/1968 | Stelzer. | |

M. CARY NELSON, Primary Examiner

ROBERT J. MILLER, Assistant Examiner

U.S. Cl. X.R.

137—493.6; 303—22